United States Patent [19]

Towsend

[11] Patent Number: 4,965,425
[45] Date of Patent: Oct. 23, 1990

[54] AUTOMATIC TURNTABLE FOR MICROWAVE OVEN

[75] Inventor: Marvin S. Towsend, Rockville, Md.

[73] Assignee: Genvention, Inc., Rockville, Md.

[21] Appl. No.: 109,529

[22] Filed: Oct. 19, 1987

[51] Int. Cl.⁵ .............................................. H05B 6/78
[52] U.S. Cl. .................... 219/10.55 F; 219/10.55 E; 108/20; 108/139
[58] Field of Search ................. 219/10.55 E, 10.55 F, 219/10.55 R; 108/20, 139; 126/338; 99/443 R

[56] References Cited

U.S. PATENT DOCUMENTS

| | | | |
|---|---|---|---|
| 4,144,435 | 3/1979 | Clark et al. | 219/10.55 E |
| 4,219,715 | 8/1980 | Mandle et al. | 219/10.55 F |
| 4,254,319 | 3/1981 | Beh et al. | 219/10.55 F |
| 4,258,630 | 3/1981 | Jorgensen et al. | 219/10.55 F |
| 4,330,696 | 5/1982 | Pomeroy et al. | 219/10.55 F |
| 4,456,805 | 6/1984 | Jorgensen et al. | 219/10.55 F |
| 4,517,432 | 5/1985 | Ishii et al. | 219/10.55 F |
| 4,518,651 | 5/1985 | Wolf et al. | 219/10.55 E |
| 4,523,070 | 6/1985 | Jorgensen et al. | 219/10.55 F |
| 4,539,454 | 9/1985 | Yangas | 219/10.55 F |
| 4,577,080 | 3/1986 | Grossman | 219/10.55 R |
| 4,590,351 | 5/1986 | Pomroy et al. | 219/10.55 F |
| 4,625,087 | 11/1986 | Jorgensen et al. | 219/10.55 F |
| 4,743,727 | 5/1988 | Joon-Yoen | 219/10.55 F |

*Primary Examiner*—Philip H. Leung
*Attorney, Agent, or Firm*—Marvin S. Towsend

[57] ABSTRACT

A spring-powered turntable for use in a microwave oven includes microwave energy responsive assembly for automatically permitting rotation of the turntable when microwave energy exposure begins and for automatically turning off rotation of the turntable when microwave energy exposure ceases. The microwave energy responsive assembly can be located between a rotating part of the turntable and a non-rotating part of the turntable. The microwave energy assembly can include a material that expands or contracts when exposed to microwave energy and serves to control a brake for braking the rotating part of the turntable.

67 Claims, 7 Drawing Sheets

AUTOMATIC TURNTABLE FOR MICROWAVE OVEN

Field of the Invention

The present invention relates to the field of microwave cooking, and more particularly to turntables for rotating food while undergoing heating in a microwave oven.

Background of the Invention

In the art of microwave cooking, turntables are known for rotating the container holding food while undergoing exposure to microwave energy. Rotation of the food during heating is desirable to bring about an even distribution of microwave energy and thereby an even heat distribution through the food.

A number of types of turntables are disclosed in the prior art. In one class of turntables, the energy for turning the turntable is derived from a portion of the microwave energy directed into the oven compartment. In another class of microwave turntables, the energy for driving the turntable is derived from an electric motor. In a third class of turntables, the energy for turning the turntable is derived from a mechanically wound spring that gradually unwinds as the turntable rotates.

In each class of turntables, an important aspect of the operation of the turntable relates to the means for starting and stopping the rotation, that is for turning the rotation of the turntable on and off. In some turntables, the operation of the turntable is controlled by a transducer that signals some sort of control circuitry extraneous to the turntable to electrically control an electrically powered rotation of the turntable. In other microwave turntables, the operation of the turntable is controlled by sensing the weight of a food and container load on the upper surface of the turntable. In this type, when the food is on the turntable, the turntable will turn. When the food (or weight of the food) is off the turntable, the turntable will not rotate.

A microwave turntable usable in many brands and sizes of microwave ovens is a turntable wherein the energy for rotating the turntable is stored in the turntable apparatus itself by a mechanically wound spring. Most commonly, such a turntable is manually turned on and off by a manually operated stop means which mechanically stops rotation or permits rotation of the turntable. However, such a manually operated stop means has the following two undesirable features: requiring the turntable to be turned on prior to the commencement of the heating of the food; and permitting the turntable to rotate the food after the microwave cooking has stopped. These undesirable features, of course, do no harm to the food, but they permit the turntable spring to unwind both before and after the need for turning the food arises, that is before the food is exposed to the microwave energy. Premature unwinding of the turntable spring requires frequent rewinding of the spring. Therefore, it would be desirable to have a microwave turntable whose rotation was automatically controlled by the presence of microwave energy that cooks or heats the food in the microwave oven.

In this regard, it would be desirable to have an add-on device for a conventional microwave turntable that would enable the turntable to be converted into one that starts and stops automatically in the presence or absence of microwave energy.

Summary of the Invention

Accordingly, it is a primary object of the present invention to provide a microwave turntable whose rotation is started automatically when the microwave energy is started and whose rotation is stopped automatically when the microwave energy is stopped.

Another object of the invention is to provide a microwave turntable which prevents premature unwinding of an internal spring which drives the turntable.

Another object is to provide an add-on for a microwave turntable to convert a conventional turntable into one that starts and stops automatically in the presence and absence of microwave energy.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved microwave turntable is provided which includes a turntable assembly and microwave energy responsive means. The turntable assembly includes a non-rotating portion, a rotating portion, means for turning the rotating portion, and a turntable energy source for powering the means for turning the rotating portion.

The microwave energy responsive means automatically permits the rotating portion to turn when exposed to microwave energy and automatically stops the turning of the rotating portion when exposure to microwave energy ceases. The microwave energy responsive means includes a microwave energy responsive material and structural elements that are moved by the microwave energy responsive material.

Preferably, the turntable energy source is a self-contained energy source, for example a wound spring.

The means for turning the rotating portion is generally a gear train which transmits power from a coiled spring to the rotating platform of the turntable.

Preferably, the microwave energy responsive means controls an automatically releasable brake for braking the rotating portion of the turntable. Preferably, the brake is spring-biased in the braked position; and the microwave energy responsive means overcomes the spring bias when exposed to microwave energy.

The brake can include: a stop element located on a non-rotating part of the turntable; and a stop portion engagement element located on a rotating part of the turntable. The stop portion engagement element can be a depression or a plurality of depressions located on a rotating part of the turntable. The stop portion engagement element can be a peg or the like that projects from a rotating portion of the means for turning the turntable, and the motion of the peg can be halted when the peg is stopped by the stop element. Generally, the stop portion engagement element is complementary to the stop element.

In another embodiment, the brake includes: a stop element located on a first rotating part of the turntable; and a stop portion engagement element located on a second rotating part of the turntable, wherein engagement of the stop element and the stop portion engagement element prevents rotation of the first and second rotating parts of the turntable.

The brake can be spring biased for braking the rotating portion, and the microwave energy responsive means can undergo a change in volume to overcome the spring bias on the brake. Presently, many materials are known which expand upon exposure to microwave energy. Materials, when identified, which contract upon exposure to microwave energy are also contemplated to be used with this invention.

Alternatively, the microwave energy responsive means can exert sufficient force upon both expansion and contraction to preclude the need for a spring bias opposing the volume change of the microwave energy responsive means.

The microwave energy responsive means can be embodied by a wide range of structures and materials. For example, the microwave energy responsive means can include a quantity of material that undergoes a change in volume when exposed to microwave energy, thereby permitting the rotating portion of the turntable to rotate. The material that undergoes a change in volume may expand or contract as it undergoes a phase change when exposed to microwave energy. The microwave energy responsive means can be a solid material which undergoes a phase change to a liquid when heated with microwave energy. In such phase change, the density of the solid material prior to melting may be less than the density of the liquid material resulting from melting of the solid material, thereby providing a material which contracts upon being heated by microwave energy.

Alternatively, the microwave energy responsive means can include a quantity of material that expands when exposed to microwave energy, thereby permitting the rotating portion of the turntable to rotate.

In still another alternative, the microwave energy responsive means can include a quantity of material that undergoes a change in shape when exposed to microwave energy, thereby permitting the rotating portion of the turntable to rotate. The material that undergoes a change in shape when exposed to microwave energy can bend when exposed to microwave energy. For example, the material can be a coil that either uncoils or coils more densely upon exposure to microwave energy.

In another embodiment, the material that undergoes a change in shape when exposed to microwave energy can include two materials having different coefficients of expansion. The material that undergoes a change in shape can be a bimetallic strip.

Alternatively, the material that undergoes a change in shape can be a biplastic strip. The biplastic strip can be two layers of homogeneous plastic material back to back having different properties with respect to absorption and heating by microwave energy. In another embodiment, the two back to back plastic materials can have additional microwave absorbing material confined therein. The additional microwave absorbing materials can have different microwave absorbing and heating characteristics.

In yet another embodiment of the invention, the microwave energy responsive means can be a transducer that absorbs a portion of the microwave energy to which it is exposed and converts that absorbed microwave energy into electrical energy to energize a solenoid which releases a brake which restrains the rotation of the turntable. When the microwave energy ceases, the solenoid is de-energized, and the brake is reapplied.

The transducer that absorbs microwave energy and converts the absorbed microwave energy into electrical energy can be located either on the turntable apparatus (either the stationary base or the rotating turntable surface) or can be located adjacent to a wall of the microwave oven compartment. A flat panel containing a plurality of transducers for converting microwave energy to electrical energy for energizing a solenoid can be retained in the microwave oven compartment adjacent to a wall so as not to occupy much space in the oven compartment. The transducers can also be arrayed along the inside walls of the stationary base and the turntable portion of the microwave turntable apparatus. The transducers can be connected together either in parallel or in series, whichever is appropriate for the electrical characteristics of the transducers and the respective solenoid. Materials and apparatus which convert microwave energy into electrical energy are known and are disclosed in the following U.S. Pat. Nos.: 3,219,904; 3,434,678; 3,479,577; 3,543,135; 4,079,268; and 4,360,741 which are incorporated herein by reference.

In accordance with yet another aspect of the invention, the microwave energy responsive means may include a thermoelectric means for producing electrical energy from heat transferred from microwave energy responsive material whose temperature rises upon exposure to microwave energy. The electrical energy produced by the thermoelectric means is used to energize a solenoid which controls a brake for the turntable.

Furthermore, there are known materials which convert incident microwave energy into thermal energy, and such materials can be employed in a thermoelectric embodiment of the invention. Such materials include simply pure water and saline water, and also include more complex materials such as are disclosed in the following U.S. Pat. No.: 4,327,364 which is incorporated herein by reference.

In accordance with another aspect of the invention, the microwave energy responsive means includes: a microwave energy absorbing material that is heated when exposed to microwave energy; and a heat absorbing material that is heated by heat that is transferred from the microwave energy absorbing material. With this aspect of the invention, the material that changes volume (such as expansion or contraction) or changes shape (such as bending) upon exposure to heat need not be heated directly by the microwave energy. The microwave energy absorbing material can be heated by the microwave energy, and the material that changes shape or volume is heated by the heat transferred by the material directly heated by the microwave energy.

The heat absorbing material that absorbs transferred heat can be a coil that uncoils upon being heated. The heat absorbing material can also be a bimetallic strip or a biplastic strip.

The microwave energy responsive material can be located between the non-rotating portion of the turntable and the rotating portion of the turntable. The microwave energy responsive material can be supported by the non-rotating portion of the turntable.

Alternatively, the microwave energy responsive material can be located in the gear train for turning the rotating portion of the turntable.

An expandable microwave energy responsive means can include an expandable housing and a microwave expandable material contained within the housing. The housing is made from materials that are substantially transparent to microwave energy so that the microwave energy passes through the housing to be absorbed by the material contained inside the housing which absorbs microwave energy and is heated thereby. The expandable housing is sealed so that as the confined material expands, a pressure is built up on the housing from within the housing.

Certain plastics are known to be substantially transparent to microwave energy. Such plastics include polyesters, polyolefins generally (e.g., polyethylene, polystyrene, and polypropylene), and polymethylmethacrylates, among others. From such microwave transparent plastics, the housing can be fabricated that contains the microwave energy absorbing material.

The material selected for fabricating the expandable housing should also be resistant to the temperature changes that occur when the microwave energy absorbing material contained in the housing heats up. In this regard, the housing materials should either be thermoplastic materials that do not soften in the operating temperature range of the microwave absorbing material, or the materials should be thermosetting plastics.

The expandable housing can be a plastic bellows. The expandable housing can also be an expandable wall foam with closed cells. The expandable housing can also be a piston in a cylinder.

In a conventional microwave turntable, a relatively large volume of free space may be present in the non-rotating portion of the turntable under the top rotating platform. With the invention, a microwave transparent expandable housing can occupy a portion of the otherwise free space in the non-rotating portion of the turntable. Even a small amount of microwave absorbing and heated material such as water can be confined inside the expandable housing and thereby build up pressure within the housing when the microwave energy is turned on. Yet the elevated pressure effects of microwave heating on the confined microwave absorbing liquid can be concentrated on a relatively small area for releasing the brake controlling the rotating platform. In this way, a force sufficient for releasing the turntable brake can be developed rapidly to release the brake soon after the microwave oven is turned on. The expandable housing can be a balloon-like structure.

The expandable housing can also be comprised of two portions, a relatively large non-expandable portion and a small expandable portion attached thereto. In this way, a large pressure build up can be readily concentrated onto a small expandable portion of the housing. The small expandable portion of the housing can be a balloon-like structure or a piston in a cylinder.

The microwave absorbing and heat expandable material can be an expandable liquid whose volume as a liquid expands and/or whose volume expands when a liquid undergoes vaporization. The expandable liquid can be water. The water can be relatively pure water, or it can contain salts such as sodium chloride which enhance its microwave absorbing characteristics. The heat expandable material can also be a solid.

The microwave expandable material contained in the housing can be a material that changes shape when exposed to microwave energy. For example, the material that changes shape can be a coil of material that tends to straighten out when exposed to microwave radiation. Alternatively, the material that changes shape can be a coil of material that tends to coil more densely when exposed to microwave radiation.

In accordance with another aspect of the invention, the microwave turntable is a self-contained mechanically-wound turntable having a start-and-stop handle for permitting the turntable to turn and for stopping the turning of the turntable. The microwave energy responsive means can be an add-on device for an already-existing turntable having a mechanical start-and-stop handle. In such an embodiment, the microwave energy responsive means expands when exposed to microwave energy and exerts an expansion force upon structures which contact the expanding microwave energy responsive means. Means are provided for directing the expansion force of the microwave energy responsive means to the mechanically operated start-and-stop handle, thereby permitting the microwave energy responsive means to automatically start and stop the turntable by automatically operating the start-and-stop handle.

In accordance with still another aspect of the invention, a microwave turntable is provided which is manually actuated to start the turning of the turntable, but whose turning is automatically stopped when exposure to microwave energy ceases. More specifically, the turntable assembly includes a substantially conventional non-rotating portion, a rotating portion, means for turning the rotating portion, and a turntable energy source for powering said means for turning said rotating portion.

The turntable assembly of the invention further includes means for permitting the rotating portion to rotate when manually actuated, such as a latch, and microwave energy responsive means for automatically stopping the turning of the rotating portion when exposure to microwave energy ceases.

In implementing this embodiment of the invention, before microwave is generated a manually actuated lever is moved to permit the turntable to turn and to set a latch which permits the turntable to turn when no microwave energy is present. Once microwave energy is generated, the microwave energy responsive means releases the latch but permits the turntable to turn as long as exposure to microwave energy continues. However, when exposure to microwave energy ceases, the turning of the turntable automatically stops because both the latch had been released and the microwave energy exposure ceases.

Still other objects of the present invention will become readily apparent to those skilled in this art from the following description, wherein there is shown and described a number of preferred embodiments of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

Brief Description of the Drawings

The accompanying drawings incorporated in and forming a part of the specification, illustrate several aspects of the present invention, and together with the description serve to explain the principles of the invention. In the drawings.

Detailed Description of the Invention

Figure 1:
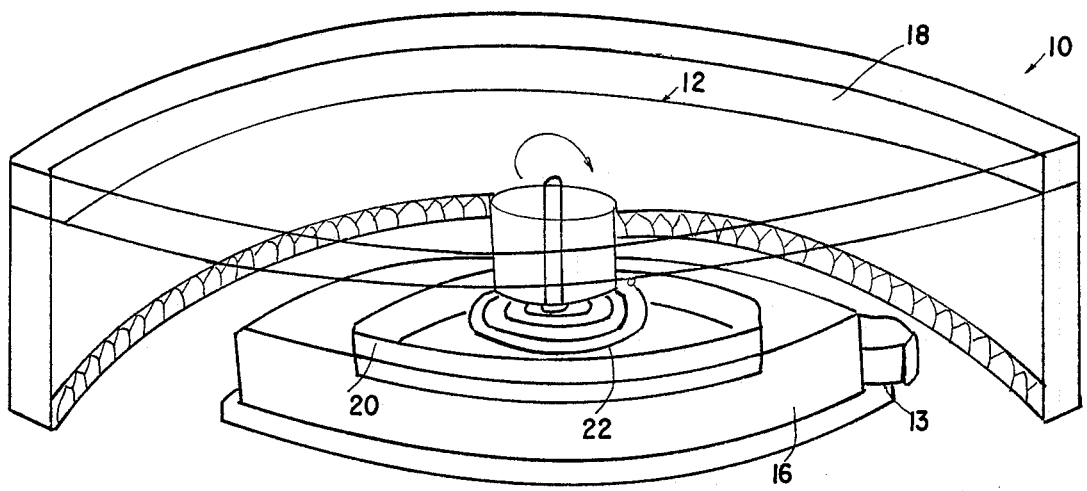
FIG. 1 is a cross-sectional view of a turntable having microwave energy responsive means located between a non-rotating portion and a rotating portion of the turntable.

With reference to FIG. 1, an improved microwave turntable 10 is provided which includes a turntable assembly 12 and a microwave energy responsive assembly 13. The turntable assembly 12 includes a non-rotating portion 16, a rotating portion 18, means for turning the rotating portion 20, and a turntable energy source 22 for powering the means for turning the rotating portion 18.

The microwave energy responsive assembly 13 is for automatically permitting the rotating portion 18 to turn when exposed to microwave energy and for automatically stopping the turning of the rotating portion 18 when exposure to microwave energy ceases. The rotating portion 18 is a rotating horizontal platform upon which the food containers are placed for heating the food contained therein in the microwave oven.

In FIG. 1, the turntable energy source is a self-contained energy source 22 such as a spiral spring used in a clock works.

As shown in FIGS. 2-15, the microwave energy responsive assembly 13 includes microwave energy responsive sub-assembly means 14 and associated elements for automatically releasing a brake 24 for braking the rotating portion 18 of the turntable.

Figure 2:
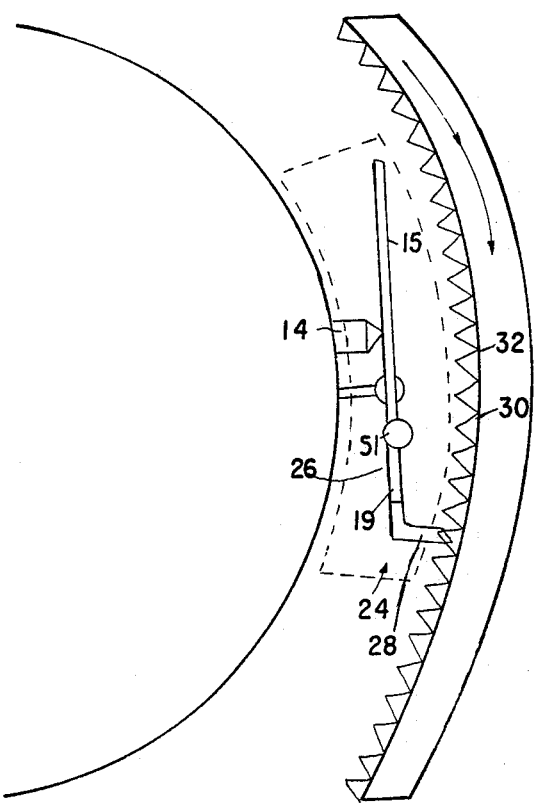
FIG. 2 is an idealized view of microwave energy responsive means that is spring-biased to brake a rotating part of the turntable.

More specifically, in FIG. 2, the brake 24 is spring-biased by spring 26 in the braked position; and the microwave energy responsive sub-assembly 14 overcomes the spring bias to release the brake when exposed to microwave energy. As the microwave energy responsive sub-assembly 14 expands, it exerts a lifting force upon first lever arm 15. The lifting force is transmitted across fulcrum 17 and reversed by the fulcrum to a compressive force to second lever arm 19 which compresses spring 26.

The brake 24 can include: a non-rotating stop element 28; and a stop portion engagement element 30 located on a rotating part of the turntable. The stop portion engagement element 30 can be depressions 32 located on an inner wall of the rotating part 18 of the turntable.

Figure 3:
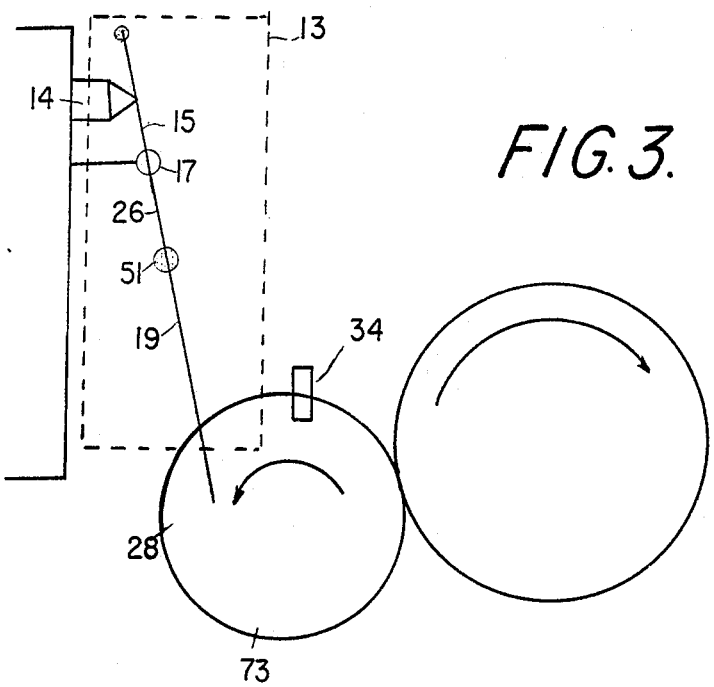
FIG. 3 is an idealized view of microwave energy responsive means located on a non-rotating part of the turntable that engages a stop peg on a rotating gear in the gear train that drives the rotating platform of the turntable.

As shown in FIG. 3, the stop portion engagement element 30 can be a peg 34 or the like that projects from a rotating portion 73 of the means for turning the turntable, and the motion of the peg 34 can be halted when the peg 34 is stopped by the stop element 28.

Figure 4:
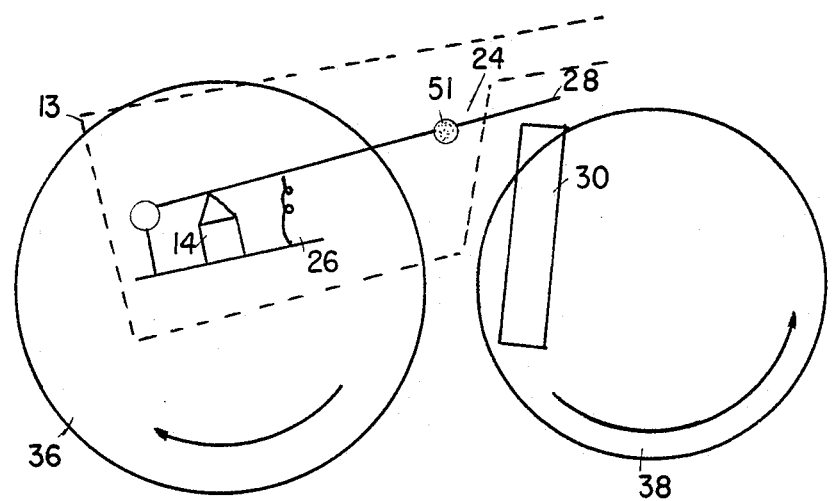
FIG. 4 is an idealized view of microwave energy responsive means located on a rotating gear in the gear train.

In another embodiment, shown in FIG. 4, the brake 24 includes: stop element 28 located on a first rotating part 36 of the means for rotating the turntable; and stop portion engagement element 30 located on a second rotating part 38 of the means for rotating the turntable, wherein engagement of the stop element 28 and the stop portion engagement element 30 prevents rotation of the first and second rotating parts of the means for rotating the turntable. In FIG. 4, spring element 26 urges stop element 28 downward to engage stop portion engagement element 30 when the microwave energy responsive sub-assembly 14 is not exposed to microwave energy. However, when exposed to microwave energy, the microwave energy responsive sub-assembly 14 expands and overcomes the bias of the spring 26 to move the stop element 28 out of engagement with the engagement element 30 to permit rotation of the first and second rotating parts 36 and 38 and thereby to permit the rotatable turntable to rotate.

Figure 5:
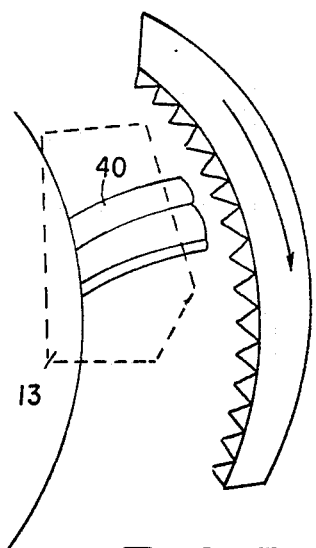
FIG. 5 is an idealized view of microwave energy responsive means in the form of a bimetallic or biplastic strip.

As shown in FIG. 5, a material that undergoes a change in shape when exposed to microwave energy can bend when exposed to microwave energy. A material that bends when exposed to microwave energy can include two materials having different coefficients of expansion such as a bimetallic strip or a biplastic strip 40.

Figure 6:
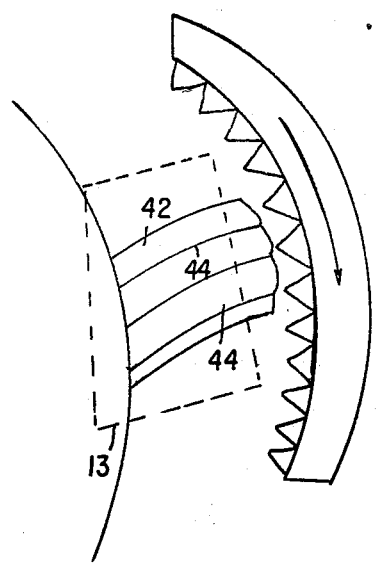
FIG. 6 is an idealized view of microwave energy responsive means that absorbs microwave energy to provide heat to be transferred to a bimetallic or biplastic strip.
Figure 7:
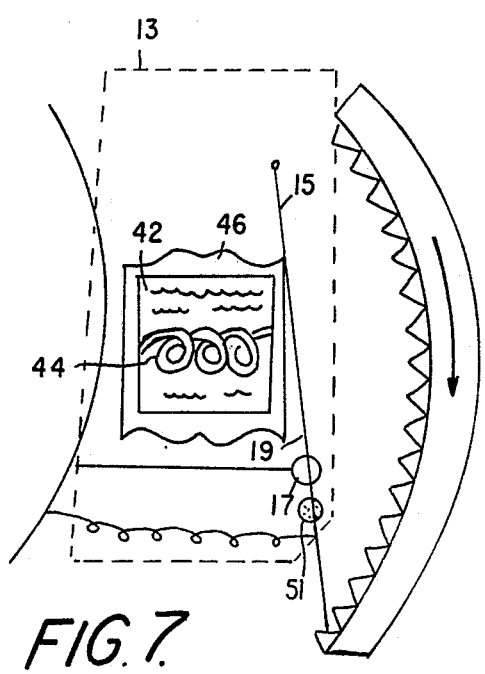
FIG. 7 is an idealized view of microwave energy responsive means which includes an expandable housing which contains a liquid which absorbs microwave energy and a coil that expands when heat is transferred from the microwave energy absorbing material.

In accordance with another aspect of the invention, as shown in FIGS. 6-7, the microwave energy responsive sub-assembly 14 includes: a microwave energy absorbing material 42 that is heated when exposed to microwave energy; and a heat absorbing material 44 that is heated by heat that is transferred from the microwave energy absorbing material 42. With this embodiment of the invention, the material that changes volume (such as expansion or contraction) or changes shape (such as bending) upon exposure to heat need not be directly heated by the microwave energy. Another material can be heated by the microwave energy, and the material that changes shape or volume is heated by the heat transferred by the material directly heated by the microwave energy.

The heat absorbing material can be a coil that uncoils upon being heated. The heat absorbing material 44 can also be a bimetallic strip or a biplastic strip.

As shown in FIG. 1, the microwave energy responsive assembly 13 can be located between the non-rotating portion 16 of the turntable and the rotating portion 18 of the turntable. The microwave energy responsive assembly can be supported by the non-rotating portion 16 of the turntable.

Figure 8:
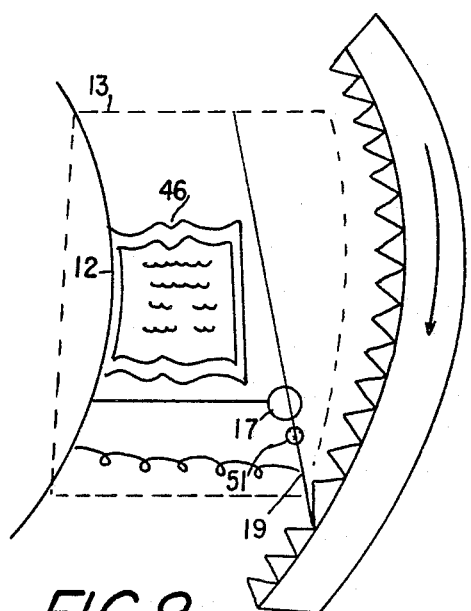
FIG. 8 is an idealized view of microwave energy responsive means which includes an expandable bellows as a housing for expandable liquid retained therein.
Figure 9:
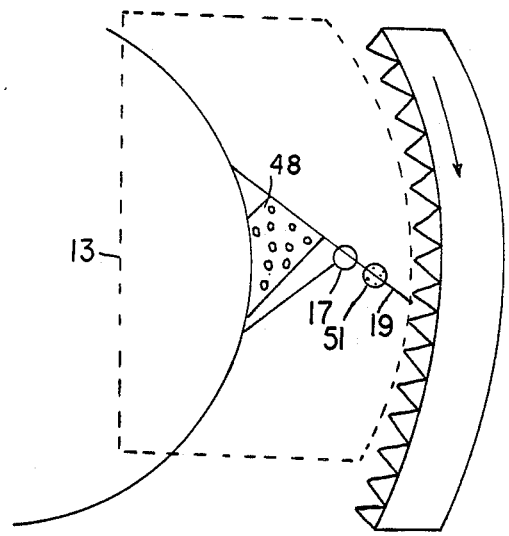
FIG. 9 is an idealized view of microwave energy responsive means which includes a closed cell foam as material which absorbs microwave energy and expands therefrom.

As shown in FIGS. 7-9, an expandable microwave energy responsive sub-assembly 14 can include an expandable housing 46 and a microwave expandable material 42 contained within the housing 46. The expandable housing 46 can be a bellows as shown in FIG. 8. As shown in FIG. 9, the expandable housing can also be an expandable wall foam 48 with closed cells.

The heat expandable material can be an expandable liquid. The expandable liquid can be water. The heat expandable material can also be a solid.

The microwave expandable material contained in the housing can be a material that changes shape when exposed to microwave energy. For example, the material that changes shape can be a coil of material 44, in FIG. 7, that tends to straighten out when exposed to microwave radiation. Alternatively, the material that changes shape can be a quantity of material that tends to coil when exposed to microwave radiation.

In the embodiment of the invention shown in FIG. 1, the microwave turntable 10 is a self-contained mechanically-wound turntable having a start-and-stop handle for permitting the turntable to turn and for stopping the turning of the turntable.

Figure 10:
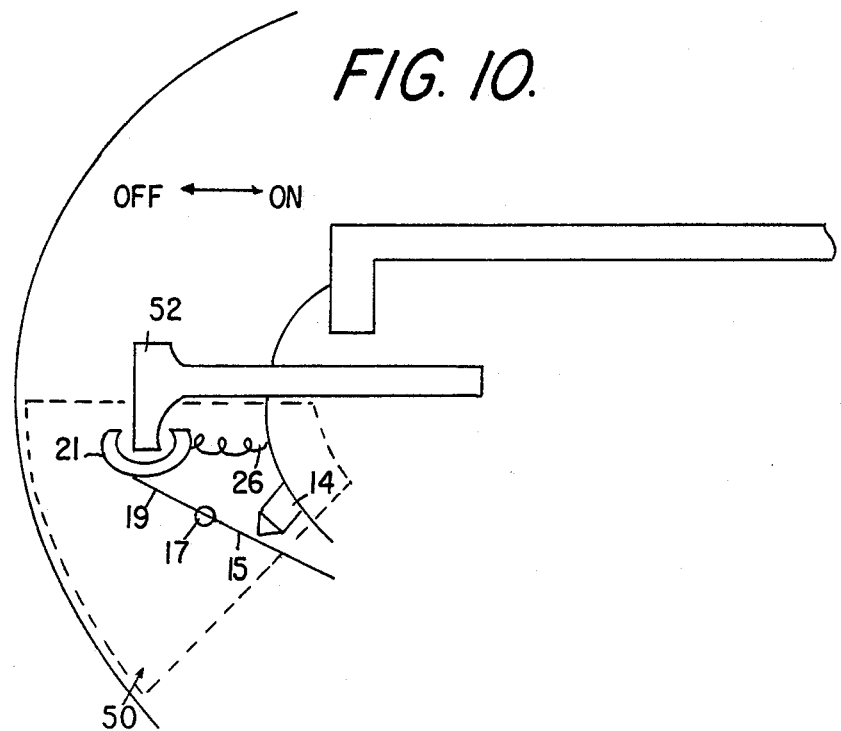
FIG. 10 is an idealized view of microwave energy responsive means that are used as an add-on to a microwave turntable that has a mechanically operated on-and-off handle.

As shown in FIG. 10, the microwave energy responsive assembly 13 can be an add-on device 50 for an already-existing turntable having a mechanical start-and-stop handle 52. In such an embodiment, the microwave energy responsive sub-assembly 14 expands when exposed to microwave energy and provides a force upon expansion. The force of expansion is transmitted through first lever arm 15, fulcrum 17, second lever arm 19, and handle-contacting U-shaped member 21 which moves the handle 52 when the microwave energy responsive sub-assembly 14 expands.

Figure 11:
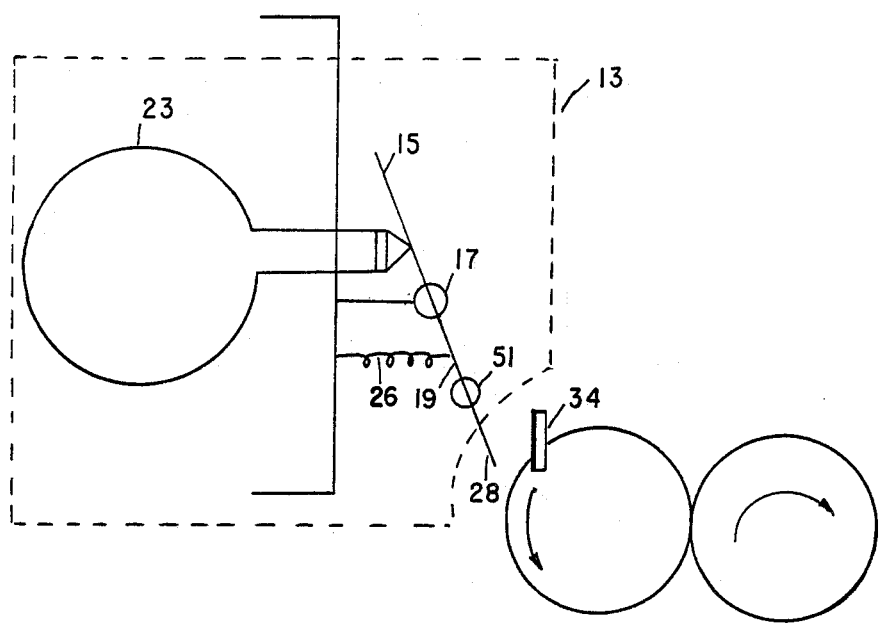
FIG. 11 is an idealized view an expandable housing in the form of a balloon-like housing.

As shown in FIG. 11, a balloon-like housing 23 can be used for housing the microwave energy responsive material.

Figure 12:
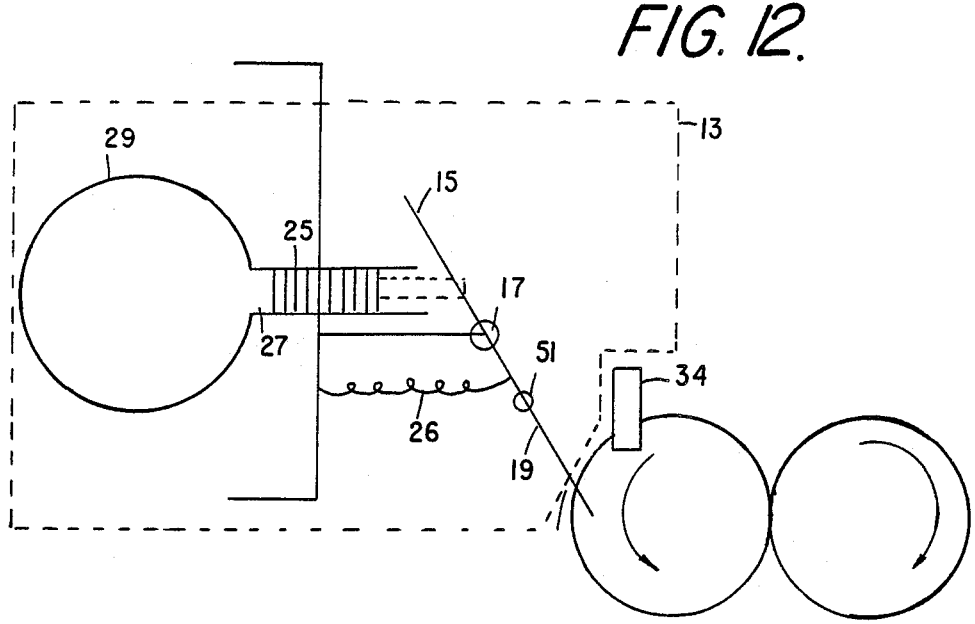
FIG. 12 is an idealized view of an expandable housing in the form of a cylinder and a piston.

As shown in FIG. 12, a piston 25 sliding in cylinder 27 can be used to respond to the expansion of the microwave absorbing material contained in a reservoir 29.

Figure 13:
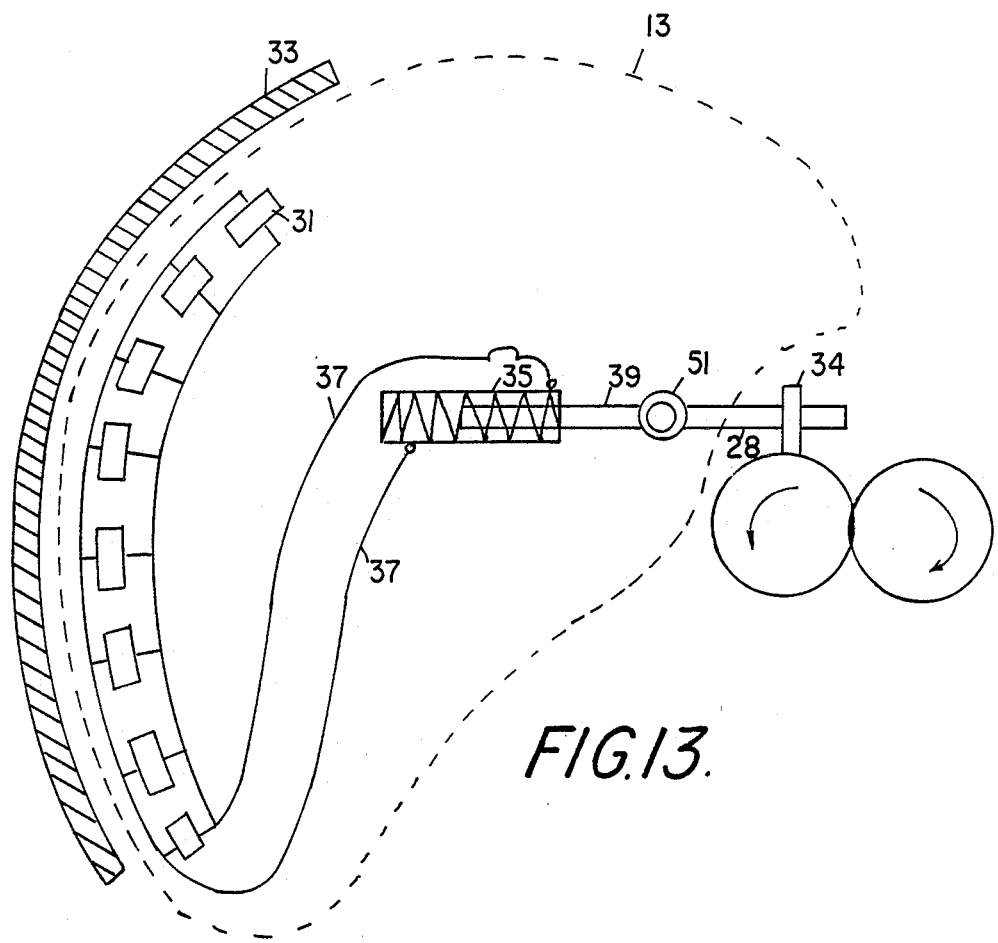
FIG. 13 is an idealized view of a transducer for converting microwave energy into electrical energy for controlling a solenoid to release a turntable brake.

Referring to FIG. 13, a plurality of transducers 31 are connected in parallel along the inside wall 33 of the stationary base. A solenoid 35 is connected to the transducers 31 by wires 37. The solenoid 35 has a plunger 39 whose end serves as a stop element 28 for engaging peg 34 on a gear in the gear train of the turntable rotation mechanism when the solenoid is not actuated. Thus, when the solenoid is not energized, the gear train for turning the turntable is effectively braked by the stop element end 28 of the plunger 39. However, when the transducers 31 are subjected to microwave energy, they generate electrical current to energize the solenoid 35 to cause the plunger 39 to be pulled away from peg 34 and deeper into the solenoid body. When the plunger 39 is pulled into the solenoid body, the stop element 28 at the end of the plunger is no longer in contact with peg 34. Thereby, the braking action of the plunger 39 is released, and the gear train for the turning the turntable is free to turn.

Figure 14:
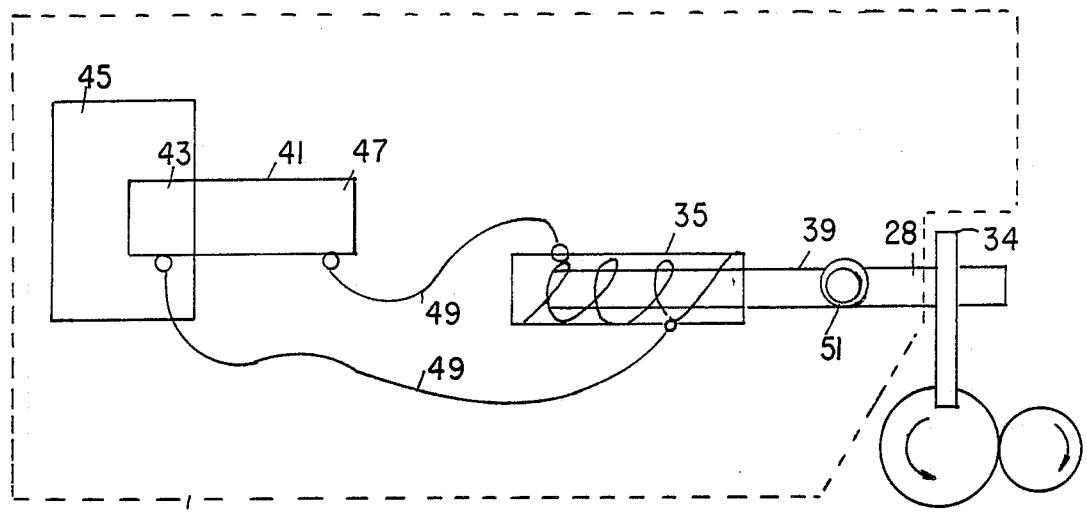
FIG. 14 is an idealized view of a thermoelectric means for releasing a turntable brake.

In FIG. 14, a thermoelectric cell 41 has one end 43 jacketed by a microwave energy absorbing material 45 and the other end outside the microwave energy absorbing material. When the oven is turned on, the microwave energy absorbing material 45 is heated by the microwave energy. End 43 of the thermoelectric cell 41 is heated by heat transfer, and end 43 becomes hotter than the other end 47 of the cell. The temperature difference in the cell 41 provides an electric current which is sent by conductors 49 to a solenoid 35. The solenoid 35 has a plunger 39 whose end serves as a stop element 28 for engaging peg 34 on a gear in the gear train of the turntable rotation mechanism when the solenoid is not actuated. Thus, when the solenoid is not energized, the gear train for turning the turntable is effectively braked by the stop element end 28 of the plunger 39. However, when the microwave energy absorbing material 45 is subjected to microwave energy, the temperature differential experienced by the thermoelectrical cell 41 provides current to energize the solenoid 35 to cause the plunger 39 to be pulled away from peg 34 and deeper into the solenoid body. When the plunger 39 is pulled into the solenoid body, the stop element 28 at the end of the plunger is no longer in contact with peg 34. Thereby, the braking action of the plunger 39 is released, and the gear train for the turning the turntable is free to turn.

In each embodiment of the invention, a provision is made in the microwave responsive assembly 13 for permitting the turntable energy source to be reenergized in the absence of microwave energy. More specifically, in a microwave turntable powered by a mechanically wound spring 22, the mechanically wound spring 22 in the microwave turntable is manually rewound. In this regard, the braking mechanism for the turntable permits the turntable drive spring 22 to be mechanically rewound when the turntable is not under the influence of microwave energy.

Figure 15:
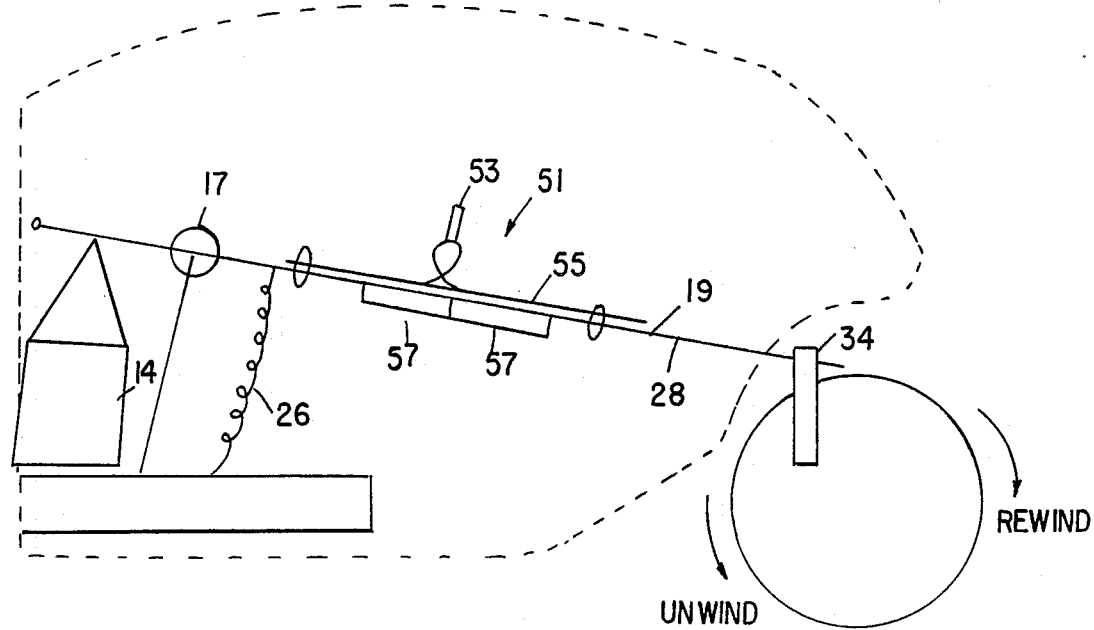
FIG. 15 is an idealized view of a microwave energy responsive means showing an enlarged hinge assembly which permits the mechanically wound driving spring for the turntable to be manually rewound when the turntable is not subjected to microwave energy.

One way of implementing these rewind characteristics in the microwave energy responsive assembly 13 is to provide a one-way, spring-biased hinge assembly 51 in the second lever arm 19 as shown in FIGS. 2, 3, 4, 7, 8, 9, 11, 12. The one-way, spring-biased hinge assembly 51 can also be present in a solenoid plunger 39 as shown in FIGS. 13 and 14. An enlarged view of a one-way hinge assembly 51 is shown in FIG. 15. The one-way hinge assembly 51 includes a hinge 53, a spring 55, and bracing elements 57 on the back side of second lever arm 19. When the turntable is not subjected to microwave energy and the turntable drive spring 22 is tending to unwind and turn the turntable, the bracing elements 57 keep the second lever arm rigid and prevent the turntable from turning. On the other hand, when the turntable is not subjected to microwave energy and the turntable drive spring 22 is being manually rewound, then the lever arm 19 bends at the hinge 53 overcoming the bias in spring 55. When the rewinding is completed, the bias spring 55 urges the lever arm 19 back into the rigid position.

Another way of implementing the desired rewind characteristics may be brought about by using an over-center toggle mechanism that is included in the microwave energy responsive assembly 13. When the microwave energy responsive assembly is not being subjected to microwave energy, then the over-center toggle mechanism is in its first position. In the first position, the over-center toggle prevents the mechanically wound turntable driving spring 22 from unwinding and thereby turning the table. In the first position, the over-center toggle mechanism also permits the mechanically wound spring 22 to be mechanically rewound. On the other hand, when the microwave energy responsive assembly 13 is under the influence of microwave energy, the over-center toggle mechanism is moved to its second position which permits the turntable to be rewound.

Other mechanical mechanisms permitting the mechanically wound spring 22 to be rewound can be used to implement the invention. The key features of such mechanisms are that: they prevent the mechanically wound turntable driving spring 22 to unwind and drive the turntable in the absence of microwave energy; they permit the turntable drive spring 22 to be rewound in the absence of microwave energy; and they permit the driving spring 22 to unwind and turn the turntable in the presence of microwave energy.

Numerous benefits result from employing the principles of the invention. With the invention, a mechanically powered microwave turntable is automatically turned on and off in the presence and absence of microwave energy, respectively. By automatically controlling the turning of the turntable, less stored energy in the turntable is wasted, and the turntable needs to be rewound less often. An embodiment of the invention can be used as an add-on attachment to already existing microwave turntables to convert them into turntables that turn on and off automatically.

The foregoing description of the invention has been presented for purposes of illustration and description. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A microwave turntable, comprising:
    a turntable assembly including a non-rotating portion, a rotating portion, means for turning said rotating portion, and a manually-wound energized turntable energy source for powering said means for turning said rotating portion,
    microwave energy responsive means including means for automatically permitting said rotating portion to turn by being driven by said manually-wound energized energy source when exposed to microwave energy and for automatically stopping the turning of said rotating portion when exposure to microwave energy ceases.

2. The microwave turntable described in claim 1 wherein said turntable energy source is a self-contained energy source.

3. The microwave turntable described in claim 1 wherein said microwave energy responsive means is an add-on device for an already-existing turntable having a mechanical start and stop means.

4. The microwave turntable described in claim 1 wherein said microwave energy responsive means includes automatically releasable brake means for said rotating portion.

5. The microwave turntable described in claim 4, wherein:
    said brake means is spring-biased in the braked position; and
    said microwave energy responsive means overcomes said spring bias when exposed to microwave energy.

6. The microwave turntable described in claim 4 wherein said brake means is biased for braking said rotating portion and wherein said microwave energy responsive means contracts and overcomes said bias of said brake means.

7. The microwave turntable described in claim 4 wherein said brake means brakes said rotating portion when the turntable is not exposed to microwave energy, and wherein said microwave energy responsive means expands and overcomes said brake means when the turntable is exposed to microwave energy.

8. The microwave turntable described in claim 1 wherein said microwave energy responsive means includes a quantity of material that undergoes a change in volume when exposed to microwave energy and thereby permits said rotating portion to rotate.

9. The microwave turntable described in claim 8 wherein said material that undergoes a change in volume when exposed to microwave energy undergoes a phase change when exposed to microwave energy.

10. The microwave turntable described in claim 8 wherein said microwave energy responsive means includes a quantity of material that contracts when exposed to microwave energy and thereby permits said rotating portion to rotate.

11. The microwave turntable described in claim 10 wherein said contractable microwave energy responsive means contracts upon being heated by microwave energy.

12. The microwave turntable described in claim 11 wherein said contractable microwave energy responsive means is a solid material which undergoes a phase change to a liquid when heated with microwave energy, and wherein the density of the solid material prior to melting is less than the density of the liquid material resulting from melting of said solid material thereby providing a material which contracts upon being heated by microwave energy.

13. The microwave turntable described in claim 1 wherein said microwave energy responsive means includes a quantity of material that undergoes a change in shape when exposed to microwave energy and thereby permits said rotating portion to rotate.

14. The microwave turntable described in claim 13 wherein said material that undergoes a change in shape when exposed to microwave energy bends when exposed to microwave energy.

15. The microwave turntable described in claim 13 wherein said material that undergoes a change in shape when exposed to microwave energy includes two materials having different coefficients of expansion.

16. The microwave turntable described in claim 15 wherein said material that undergoes a change in shape is a bimetallic strip.

17. The microwave turntable described in claim 15 wherein said material that undergoes a change in shape is a biplastic strip.

18. The microwave turntable described in claim 1 wherein said microwave energy responsive means includes:

a microwave energy absorbing material that is heated when exposed to microwave energy; and a heat absorbing material that is heated by heat that is transferred from said microwave energy absorbing material.

19. The microwave turntable described in claim 18 wherein said heat absorbing material expands upon being heated from the heat transferred from said microwave energy absorbing material.

20. The microwave turntable described in claim 18 wherein said heat absorbing material is a material that changes shape when heated.

21. The microwave turntable described in claim 20 wherein said heat absorbing material is a coil that uncoils upon being heated.

22. The microwave turntable described in claim 18 wherein said heat absorbing material is a bimetallic strip.

23. The microwave turntable described in claim 18 wherein said heat absorbing material is a biplastic strip.

24. The microwave turntable described in claim 23 wherein said biplastic strip is comprised of two layers of homogeneous plastic material back to back having different properties with respect to absorption and heating by microwave energy.

25. The microwave turntable described in claim 23 wherein said said biplastic strip is comprised of two back to back plastic materials, said two plastic materials containing two microwave absorbing materials confined therein, said respective microwave absorbing materials having different microwave absorbing and heating characteristics.

26. The microwave turntable described in claim 18 wherein said heat absorbing material is a material that contracts when heated.

27. The microwave turntable described in claim 1 wherein said microwave energy responsive means is located between said non-rotating portion of the turntable and said rotating portion of the turntable.

28. The microwave turntable described in claim 27 wherein said microwave energy responsive means is supported by said non-rotating portion of the turntable and is located between said non-rotating portion of the turntable and said rotating portion of the turntable.

29. The microwave turntable described in claim 1 wherein said microwave energy responsive means is located on said means for turning said rotating portion.

30. The microwave turntable described in claim 29 wherein said microwave energy responsive means engages a stop element engagement means located in said means for turning said rotating portion.

31. The microwave turntable described in claim 29 wherein said microwave energy responsive means engages a stop element engagement means located on said non-rotating portion of said turntable.

32. The microwave turntable described in claim 1 wherein said microwave energy responsive means includes transducer means for converting microwave energy into electrical energy.

33. The microwave turntable described in claim 32, further including solenoid means actuated by the electrical energy produced by said transducer means.

34. The microwave turntable described in claim 33 wherein said solenoid means includes means for braking said turntable and for permitting said turntable to turn.

35. The microwave turntable described in claim 1 wherein said microwave energy responsive means includes thermoelectric means for producing electrical energy from heat transferred from microwave energy responsive material whose temperature rises upon exposure to microwave energy.

36. The microwave turntable described in claim 35, further including solenoid means actuated by the electrical energy produced by said thermoelectric means.

37. The microwave turntable described in claim 36 wherein said solenoid means includes means for braking said turntable and for permitting said turntable to turn.

38. The microwave turntable described in claim 1 wherein said microwave energy responsive means includes means permitting said turntable energy source to be reenergized in the absence of microwave energy.

39. A microwave turntable, comprising:

a turntable assembly including a non-rotating portion, a rotating portion, means for turning said rotating portion, and a mechanically energized turntable energy source for powering said means for turning said rotating portion microwave energy responsive means including means for automatically permitting said rotating portion to turn by being driven by said mechanically energized energy source when exposed to microwave energy and for automatically stopping the turning of said rotating portion when exposure to microwave energy ceases, wherein:

said microwave energy responsive means includes automatically releasable brake means for said rotating portion, and said brake means includes:

stop means located on a non-rotating part of said turntable; and stop portion engagement means located on a rotating part of said turntable.

40. The microwave turntable described in claim 39 wherein said stop portion engagement means is a depression located on a rotating part of said turntable.

41. The microwave turntable described in claim 39 wherein said stop portion engagement means is a projection on a rotating portion of said means for turning said rotating portion which is engaged by said stop means supported by a non-rotating portion of the turntable.

42. The microwave turntable described in claim 39 wherein said stop portion engagement means is complementary to said stop means.

43. The microwave turntable described in claim 39 wherein said brake means includes:

stop means located on a first rotating part of said turntable; and stop portion engagement means located on a second rotating part of said turntable, wherein engagement of said stop means and said stop portion engagement means prevents rotation of said first and second rotating parts.

44. A microwave turntable, comprising:

a turntable assembly including a non-rotating portion, a rotating portion, means for turning said rotating portion, and a mechanically energized turntable energy source for powering said means for turning said rotating portion, microwave energy responsive means including means for automatically permitting said rotating portion to turn by being driven by said mechanically energized energy source when exposed to microwave energy and for automatically stopping the turning of said rotating portion when exposure to microwave energy ceases, wherein said microwave energy responsive means includes automatically releasable brake means for said rotating portion, wherein said brake means brakes said rotating portion when the turntable is not exposed to microwave energy, and wherein said microwave energy responsive means expands and overcomes said brake means when the turntable is exposed to microwave energy, wherein said expandable microwave energy responsive means includes an expandable housing and a microwave energy expandable material contained within said housing.

45. The microwave turntable described in claim 44 wherein said expandable housing is a bellows.

46. The microwave turntable described in claim 44 wherein said expandable housing is an expandable wall foam with closed cells.

47. The microwave turntable described in claim 44 wherein said expandable housing is a piston and cylinder combination.

48. The microwave turntable described in claim 44 wherein said expandable housing is made from materials that are substantially transparent to microwave energy.

49. The microwave turntable described in claim 44 wherein said expandable housing is made from material selected from the group consisting of polyesters and polyolefins.

50. The microwave turntable described in claim 44 wherein said expandable housing is made from thermoplastic materials that do not soften in the operating temperature range of the microwave absorbing material.

51. The microwave turntable described in claim 44 wherein said expandable housing is made from thermosetting plastics.

52. The microwave turntable described in claim 44 wherein said heat expandable material is an expandable liquid.

53. The microwave turntable described in claim 52 wherein said expandable liquid is water.

54. The microwave turntable described in claim 52 wherein said expandable liquid is saline water.

55. The microwave turntable described in claim 44 wherein said heat expandable material is a solid.

56. The microwave turntable described in claim 44 wherein said microwave expandable material contained in said housing is a material that changes shape when exposed to microwave energy.

57. The microwave turntable described in claim 56 wherein said material that changes shape is a coil of material that tends to straighten out when exposed to microwave radiation.

58. The microwave turntable described in claim 56 wherein said material that changes shape is a quantity of material that tends to coil when exposed to microwave radiation.

59. The microwave turntable described in claim 44 wherein said microwave expandable material contained in said housing is a material that changes volume when exposed to microwave energy.

60. The microwave turntable described in claim 44 wherein said expandable housing can occupy a relatively large volume of the space in the non-rotating portion.

61. The microwave turntable described in claim 60 wherein said relatively large expandable housing contains a relatively small amount of microwave absorbing and heated material permitting pressure to build up within the housing when the microwave energy is turned on.

62. The microwave turntable described in claim 61 wherein the pressure effects of microwave heating on the confined microwave absorbing material are concentrated on a relatively small area for releasing the brake on the rotating platform.

63. The microwave turntable described in claim 44 wherein said expandable housing is comprised of a relatively large non-expandable portion and a relatively small expandable portion integral therewith.

64. A microwave turntable, comprising:
a self-contained mechanically-wound turntable energy source for turning the turntable,
mechanical start and stop means for permitting the turntable to turn and for stopping the turning of the turntable,
microwave energy responsive means for automatically operating said mechanical start and stop means for permitting the turntable to turn when exposed to microwave energy and for automatically operating said mechanical start and stop means for stopping the turning of the turntable when exposure to microwave energy ceases.

65. An automatic start and stop apparatus for a microwave turntable which includes a manually operated start-and-stop handle, said apparatus comprising:
microwave energy responsive means that expands when exposed to microwave energy providing a force upon expansion.
means for directing the expansion force of said microwave energy responsive means to the manually operated start-and-stop turntable handle thereby permitting said microwave energy responsive means to automatically start and stop the turntable by automatically operating the handle.

66. A microwave turntable, comprising:
a turntable assembly including a non-rotating portion, a rotating portion, means for turning said rotating portion, and a turntable energy source for powering said means for turning said rotating portion,
means for permitting said rotating portion to turn when manually actuated, and
microwave energy responsive means for automatically stopping the turning of said rotating portion when exposure to microwave energy ceases.

67. The microwave turntable described in claim 66 wherein said means for permitting said rotating portion to turn when manually actuated are latch means.

* * * * *